US012743315B2

(12) United States Patent
Radha et al.

(10) Patent No.: US 12,743,315 B2
(45) Date of Patent: Sep. 22, 2026

(54) SYSTEM AND METHOD OF ADAPTATIVE SCALABLE MICROSERVICE

(71) Applicant: Dell Products L.P., Round Rock, TX (US)

(72) Inventors: Jayashree Radha, Bangalore (IN); Shelesh Chopra, Bangalore (IN); Gururaj Kulkarni, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 697 days.

(21) Appl. No.: 17/804,746

(22) Filed: May 31, 2022

(65) Prior Publication Data

US 2023/0342213 A1 Oct. 26, 2023

Related U.S. Application Data

(63) Continuation-in-part of application No. 17/660,145, filed on Apr. 21, 2022.

(51) Int. Cl.
*G06F 9/50* (2006.01)
*G06F 11/34* (2006.01)

(52) U.S. Cl.
CPC ............ *G06F 9/505* (2013.01); *G06F 9/5083* (2013.01); *G06F 11/3433* (2013.01); *G06F 2209/503* (2013.01)

(58) Field of Classification Search
CPC .... G06F 9/505; G06F 9/5083; G06F 11/3433; G06F 2209/503
See application file for complete search history.

(56) References Cited

U.S. PATENT DOCUMENTS

| | | | | |
|---|---|---|---|---|
| 11,989,586 | B1 | 5/2024 | Srikanta et al. | |
| 2009/0025004 | A1 | 1/2009 | Barnard et al. | |
| 2014/0258546 | A1 | 9/2014 | Janssens et al. | |
| 2014/0331233 | A1 | 11/2014 | Matskevich et al. | |
| 2015/0248313 | A1 | 9/2015 | Vijayarangan et al. | |
| 2017/0134305 | A1* | 5/2017 | Mahajan | H04L 41/22 |
| 2018/0181390 | A1* | 6/2018 | Lepcha | G06F 9/5066 |
| 2019/0243682 | A1 | 8/2019 | Botelho | |
| 2019/0243691 | A1* | 8/2019 | LaBute | G06N 3/09 |
| 2020/0167204 | A1 | 5/2020 | Aronovich et al. | |
| 2020/0174892 | A1* | 6/2020 | Muehge | G06F 3/0659 |
| 2020/0210223 | A1* | 7/2020 | Saka | G06F 9/546 |
| 2021/0373926 | A1* | 12/2021 | Chen | G06F 9/5044 |
| 2023/0077240 | A1* | 3/2023 | Sawazaki | H04L 47/122 |
| 2024/0403131 | A1* | 12/2024 | Eker | H04L 41/16 |

* cited by examiner

*Primary Examiner* — Aimee Li
*Assistant Examiner* — Harrison Li
(74) *Attorney, Agent, or Firm* — Workman Nydegger

(57) ABSTRACT

One example method includes analyzing a load factor regarding a workload for one or more actors in a data storage platform, wherein the workload includes a group of two or more connected jobs, applying one or more criteria to an output of the load factor analyzing, based on the applying a criterion from the one or more criteria, determining how many actors should be included in a swarm of actors necessary to perform all of the connected jobs, spawning the swarm of actors, and load balancing the connected jobs across the swarm of actors.

18 Claims, 5 Drawing Sheets

SYSTEM AND METHOD OF ADAPTATIVE SCALABLE MICROSERVICE

FIELD OF THE INVENTION

Embodiments of the present invention generally relate to the use of microservices and related environments and architectures. More particularly, at least some embodiments of the invention relate to systems, hardware, software, computer-readable media, and methods for dynamically scaling microservices up and down as needed to accommodate ongoing changes in demand for the microservices.

BACKGROUND

Distributed microservices based architecture continues to grow as an architecture choice for building complex application stacks. Microservices architecture is becoming a kind of de-facto choice for applications which reduces multiple level of dependencies in Agile methodologies and DevOps cycle and improves go-to market strategy. In a monolithic application, components invoke one another via function calls and may be using single programming language. However, a microservices-based application uses a distributed architecture with multiple services interacting each other. These services may run on a single machine, or on highly available clustered machines. These microservices also interact with other software service running on different machine such as "agents running on different host." Each service instance is performing unique set of tasks which is independent of other services and communicates with other microservices using either REST API or message bus architecture.

Modern applications built with microservice architecture are being heavily invested in efforts to be able to dynamically adjust resource requirements, as the demand for resources cannot always be predicted. For example, a system may experience the spiking of resource demands at certain un-usual intervals. While such spikes may not occur frequently, when they do occur, then failure impact may be high, and may be cascaded to the entire system.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figures 1, 2:
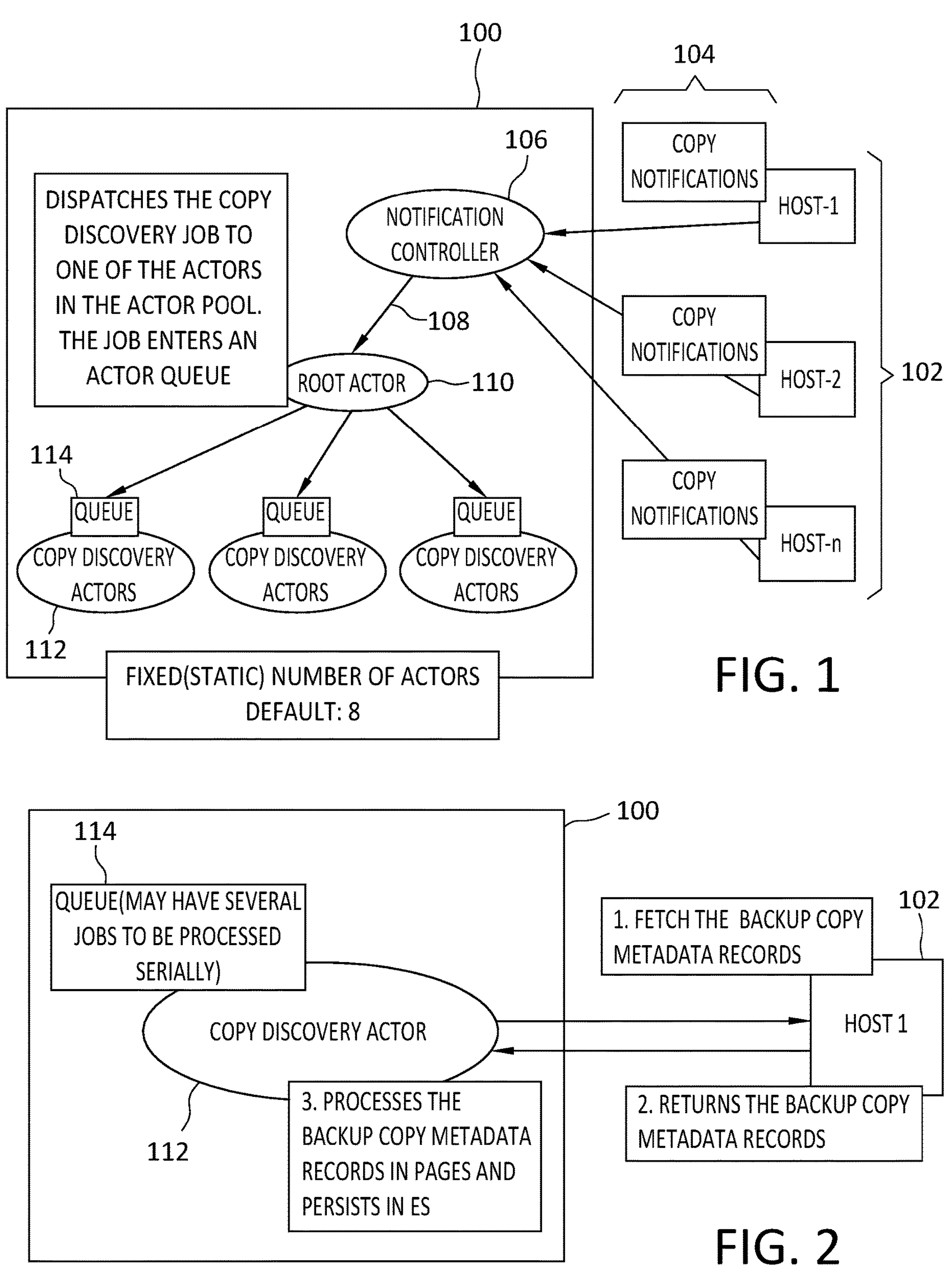
FIG. 1 discloses aspects of an operating configuration that includes a static number of actors.
FIG. 2 discloses aspects of example operations of an actor, according to some example embodiments.

Embodiments of the present invention generally relate to the use of microservices and related environments and architectures. More particularly, at least some embodiments of the invention relate to systems, hardware, software, computer-readable media, and methods for dynamically scaling microservices up and down as needed to accommodate ongoing changes in demand for the microservices.

In general, example embodiments of the invention may operate to analyze a load factor on a microservice, or microservices, and determine, based on the load factor, a number of actors needed to support the load for SLA compliance or other criteria. If the existing number of actors is determined to be inadequate in this regard, one or more additional actors may be spawned, and the load automatically distributed among all the actors. In some embodiments, the number of actors spawned, and/or load distribution decisions, may be based upon a respective queue depth of one or more actors, and the latency associated with processing operations performed by those actors.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, some embodiments may automatically, and dynamically, scale a number of actors, up or down, based on a load analysis. An embodiment may help to ensure optimum resource allocation to one or more workloads, even in circumstances where resource needs may change dynamically. An embodiment may dynamically consider the performance of one or more individual actors in determining how many additional actors may need to be spawned, and/or in determining how to allocate a workload. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

In a distributed microservices architecture, one example of which is the Dell Technology PowerProtect Data Manager (PPDM), business services drive the demands from application hosts. For example, for self-service or centralized backups, application agent hosts may initiate the copy discovery notification to PPDM server. That is, when a backup has been created by a backup application at a host, backup metadata may also be generated by the backup application. An agent of the backup application at the host may then notify, such as by sending a copy discovery notification, a data storage platform that the backup has been created, and the host may also transmit the backup metadata to the storage platform. Each copy discovery notification, or message, may identify a number of records, at the host, that need to be accessed by the storage platform, and stored at the storage platform. As illustrated by the following example, the number of backup copies, or simply 'copies,' that may be generated in a typical operating environment may be quite large, and may accumulate quickly.

Assume that there are a number of hosts, such as 100 SQL servers, each with 100 assets, such as databases, that need to be backed up. Further assume that there is 15 minute log backup for each asset, that is, each asset must be backed up, or copied, every 15 minutes. This means that every hour, each of these hosts must create 400 backups, or copies. In one 24 hour period then, each host will create 9600 copies (24×400). Across all 100 hosts, 960K (9600×100) copies will be created every 24 hours.

Consider now one typical example of copy discovery for self-service backup from a PPDM server. If each host is consistently sending the same copies to be discovered, then a microservice, such as a microservice that operates to retrieve and store copies created by one or more hosts, may be statically configured to meet the demand of copy discovery of that scale. Thus, if there are no problems or issues in the system, the resources, or actors, needed by the microservices handling the storage of the copies can be sized based on the expected number of copies to be made by the hosts.

In a typical production environment however, the system encounters problems and situations where demand for the microservice may suddenly surge. To illustrate the impact that such problems may have, suppose that the data protection server, which may be a PPDM server for example, is down for day or more, due to disaster situation or maintenance operation, self-service backups, that is, backups created at the hosts, may still continue to be created on agent hosts, notwithstanding the problem on the storage side of the system. The agent hosts may continue to send copy discovery notifications to the data protection server.

When the data protection server resumes operations, it has to handle a backlog of copies that were created at the hosts, but not stored because of the problem at the storage platform. Assuming that the storage platform was down for two days, and continuing with the earlier example of 100 SQL servers that each include 100 assets, the storage platform now has to handle 1,920,000 (960K copies/day×2 days) copies, along with its normal daily load of 960,000 copies.

Or, suppose that storage platform communication to the backup agent was temporarily lost due to some unknown network glitch. If self-service backups, that is, stand-alone backups created by the hosts, continue to be created, then the storage platform has to handle the situation of more copies being discovered when the connection between the storage platform and the hosts is restored. If this situation were to continue for more than 4-5 days, for example, then the storage server would struggle, and possibly fail, to catch-up the discovery of the copies that need to be accessed and stored.

In the example case of PPDM, the Application Data Manager (ADM) microservice has statically configured actor threads that handle operations such as copy discovery, copy deletion, and copy storage. These static actor threads are configured to meet a maximum demand of 'n' copies per day, where 'n' may be any whole integer. In some examples, 'n' may be around 100K, but it could be higher or lower. Thus, if more copies are required to be handled, as in the illustrative case discussed above, then the ADM microservice will start struggle to handle the surge of copies.

In view of these, and other, concerns, example embodiments may operate to assess the surge in demand and adjust the appropriate resource demands dynamically. Particularly, embodiments may allocate resources based on current resource utilization, and additional loads, so as to effectively handle the surge of copy discovery. Embodiments may also automatically reduce the number of threads, or actors, during low loads and idle states.

B. Aspects of Some Example Operating Environments

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients.

Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIGS. 1 and 2, details are provided concerning some example environments in which embodiments of the invention may be employed. As shown in FIG. 1, a storage environment 100, such as PPDM for example, may communicate with one or more hosts 102 for the purpose of storing backups created by those hosts 102. As the hosts 102 generate backups, they may transmit copy discovery notifications 104 to the storage environment 100, indicating to the storage environment 100 that the hosts 102 have backups, or 'copies,' that need to be stored at the storage environment 100.

The storage environment 100 may have a notification controller 106 that receives the copy discovery notifications 104. The notification controller 106 may generate, based on one or more of the copy discovery notifications 104, a copy discovery job 108 that may specify a particular host 102 that has one or more copies ready for storage at the storage environment 100. The copy discovery job 108 may be passed to a root actor 110 that may communicate with a pool of one or more copy discovery actors 112. In some conventional approaches, the number of copy discovery actors 112 may be fixed. After the root actor 110 receives the copy discovery job 108, the root actor 110 may then dispatch the copy discovery job 108 to one of the copy discovery actors 112 in the pool, and the copy discovery job 108 may then be added to the queue 114 for that copy discovery actor 112.

In more detail, and with reference now to FIG. 2, the copy discovery actor 112 may check for the next job in the queue 114, and then request the metadata records of a backup copy from the host 102. The host 102 may then return the backup copy metadata records to the copy discovery actor 112. The copy discovery actor 112 may then process the backup copy metadata records in pages, and persist the backup copy metadata records in ES (Elastic Search). The backup copy metadata records may, among other things, enable later search for, and retrieval of, the backup copy.

With the current implementation of static number of actors, as in the example noted above, a workload may be distributed among limited, and constant, number of actors, leading to slow performance and delayed operations. Thus, the storage server and storage platform are unable to respond to dynamic loading, on-demand. For example, in a system with a static number of actors, if there were a sudden surge in the number of copy discovery notifications from different hosts, no additional resources are available for handling the surge and, as a result, performance of the copy discovery actors, and the storage platform, will be impaired.

C. Aspects of Some Example Embodiments

In light of known problems and shortcomings in current approaches and architectures, example embodiments may add an analytical capability within a storage platform, such as DellEMC PowerProtect Data Manager (PPDM) for example, that may operate to analyze a load factor and, based on that analysis, determine a number of actors needed, spawn any additional actors needed, and then automatically distribute the load among the available actors, including the dynamically spawned actors.

To illustrate, an example implementation of a load analysis may comprise measuring the individual actor queue performance based on (1) its queue depth and (2) latency of message processing per queue, and (3) average processing time for each queue item. An analytic engine may dynamically determine the number of actors needed based on the arrival load of copy discovery notifications to be processed from various hosts, that is, based on the arrival load, an existing load per actor, based on queue depth and number of copies to be processed per message in the queue, and average processing time for 100 copies. The analytic engine may then measure the performance of service (such as CPU, latency, and average time to process the queue), to decide the number of total, and additional, actors required depending on the load.

C.1 Example Analytic Engine

Figure 3:
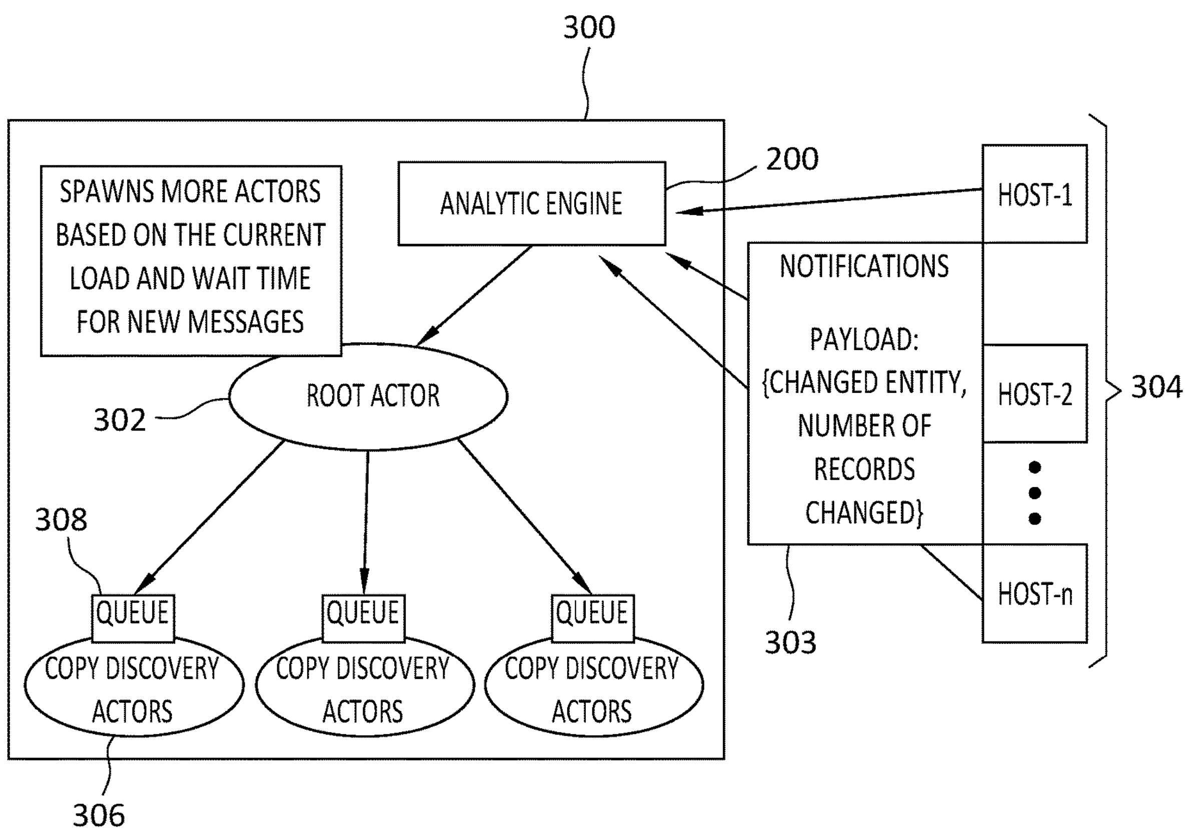
FIG. 3 discloses aspects of an example analytic engine and associated operations, according to some example embodiments.

As noted earlier, and with reference now to the example of FIG. 3, example embodiments may provide for the construction and use of an analytic engine 200 within a storage platform 300, such as PPDM for example, that cooperates with a root actor 302 and is operable to analyze a load factor, one example of which is a number of copy discovery notifications 303 coming from various hosts 304, and then dynamically determine if the number of actors 306 needs to be increased. The analytic engine 200 may provide this actor information to the storage platform 300, which may then dynamically spawn any additional actors 306 needed, and then balance the load across the actors 306. The load balancing may be performed based on parameters such as a queue 308 size of the actors 306. Briefly, an actor 306 with a relatively short queue 308 may be more likely to be assigned part of the load than another actor 306 with a relatively longer queue 308.

The analytic engine 200 may keep track of a current load, the average time taken by each actor 306 to process the number of records per copy discovery notification 303 from single host 304. The analytic engine 200 may then determine the number of actors 306 needed, and their respective queue sizes, possibly based on a dynamically increasing #records per copy discovery notification 303 from various hosts 304. The number of records per copy discovery notification 303 refers to #copies (such as self-service backup copies) created on a given host 304. While doing this, the analytic engine 200 may also analyze the resource utilization, such as CPU % for example, needed to process "N" number of records per actor 306. The analytic engine 200 may maintain a two-dimensional metric to process the copy discovery notifications 303 received at the storage platform 300 from the hosts 304. The metrics may include (1) the #actors needed, and (2) the average queue size for those actors 306. Both of these metrics may dynamically change, possibly without any warning, and may thus impact an average time taken to process the records per notification 303.

Particularly, the analytic engine 200 may dynamically determine if the number of actors 306 need to be increased for copy discovery based on the following criteria: (1) existing load on the system; (2) the current average time-on a system-wide basis, single operation basis, and/or individual/group actor 306 basis-to process a single copy discovery notification 303, or 'message'; (3) total wait time in the respective queues of one or more existing actors 306—that is, actors 306 that exist prior to a spawning process—for the processing of any new message; (4) threshold (acceptable) wait time for any new message to be processed by an actor 306, or actors 306; and (5) available CPU/memory and current CPU/memory utilization, for each of one or more actors 306. Further details are now provided concerning the aforementioned criteria.

With regard first to criterion (1), the analytic engine 200 may calculate the existing current load for an operation that is being handled, or scheduled to be handled. To calculate a current load, the analytic engine 200 may measure (a) the current number of actors 306 and (b) a respective queue depth of each actor 306.

For criterion (2), the analytic engine 200 may calculate the average time to process 'N' records, by a given actor 306, given a then-current queue depth for that given actor 306. To obtain the current average time, embodiments may take an average for 100 records, where each page size may be defaulted to 100 records. This may be calculated every time the copy records are processed at the storage platform 300, so that at any point, there is a current average for 100 records (assuming 100 records is the page size).

Regarding criterion (3), the analytic engine 200 may then calculate the total wait time depending on the number of copy records to be processed per copy discovery notification 303 from each host 304. Note that a copy discovery notification 303 may indicate the number of entities, that is, copy records, that have changed since a previous timestamp made by the host 304 that sent that copy discovery notification 303.

Finally, with regard to criterion (4), to calculate total wait time for an incoming message, the following operations may be performed by the analytic engine 200. Particularly, any message that comes in to the storage platform from a host may have a field that contains the total number of entities, that is, copy records, that have been changed as part of that notification 303. So, based on (i) the current average processing time for 100 records, obtained as discussed in connection with criterion (2) above, (ii) the number of copy records that need to be processed for each message, or copy discovery notification 300, which identifies the number of copy records for processing, (iii) the existing queue depth at each actor and (iv) the current total number of actors, the wait time for any new message, or copy discovery notification 303, may be determined.

C.2 Example Operations of An Analytic Engine

Following is a hypothetical example of one or more operations of an analytic engine, such as the analytic engine 200, according to some example embodiments. Particularly, assume the following:

a) New message says "1000" records are to be processed;
b) Current average time to process 100 records is 3 mins in the current scale; and
c) Assume there are 5 actors with existing queue depth of 10 messages in each actor—and further assume each message in the queue has around 500 records (for example) to be processed, then the wait time for a new message (even to process the first record of the message) may be calculated as follows:

a. Assume the new message goes to the first actor (note that the actor that is deemed to be 'first' may vary if an embodiment uses a round robin, or smallest mail box, actor algorithm), and that this actor already has 10 messages. Each message has 500 records to be processed. Processing time for 100 records is 3 minutes, so the total processing time for each message with total 500 records is 15 minutes. Since messages in an actor may be processed serially, total time to complete all 10 outstanding messages is 150 mins. Similarly, this calculation may be performed for all existing actors to determine the lowest wait time, as among those actors. In this example, the wait time is 150 mins for the 'first' actor. Thus, any new message from a host 304 to the storage platform 300 will have to wait at least 150 mins before the message will start being processed.
b. Further assume that a wait tolerance configured, such as in a config file, is only 20 mins—as noted above however, the best case current wait time of 150 minutes is much longer than 20 minutes—thus, it may be concluded that one or more new actors need to be created. For this case, based on the new incoming load, such as 1000 records from one host, for example, it may be enough to create one new actor, because this message, with the 1000 records, will be the first message in the queue of that new actor and, thus, the wait time for this particular message at the new actor will be zero.

However, if the analytic engine 200 receives notification from 2 hosts, for example, at the same time with 1000 records each, then creating just one new actor may not suffice, because considering processing time for 100 records (3 mins), the first message itself will consume 30 mins (10*3), which exceeds the wait tolerance of 20 minutes. So, the second message would have to wait for 30 mins if it goes to the same actor. So, the second message needs to go to a new actor. In this case then, 2 new actors may be needed.

Note that logic embodied in the analytic engine may also include the CPU/memory utilization values to calculate if new actors should be created. For example, for cases where the user has a critical workload that is running currently, and if the CPU utilization is already high, the default threshold wait time may be automatically adjusted to prioritize the critical workload relative to the copy discovery operation. If the CPU utilization comes down, such as below 80% for example, then to expedite the discovery process, the threshold wait time may be automatically be lowered, so that a number of actors working on the project are dynamically increased to finish the copy discovery operation faster.

The analytic engine may run the algorithm described above and check the current wait time against a threshold wait time, which may be user configurable, for any new message. Then, if the wait time is greater than the threshold wait time, the analytic engine may decide to spawn more actors to handle the new load.

D. Example Methods

Figure 4A:
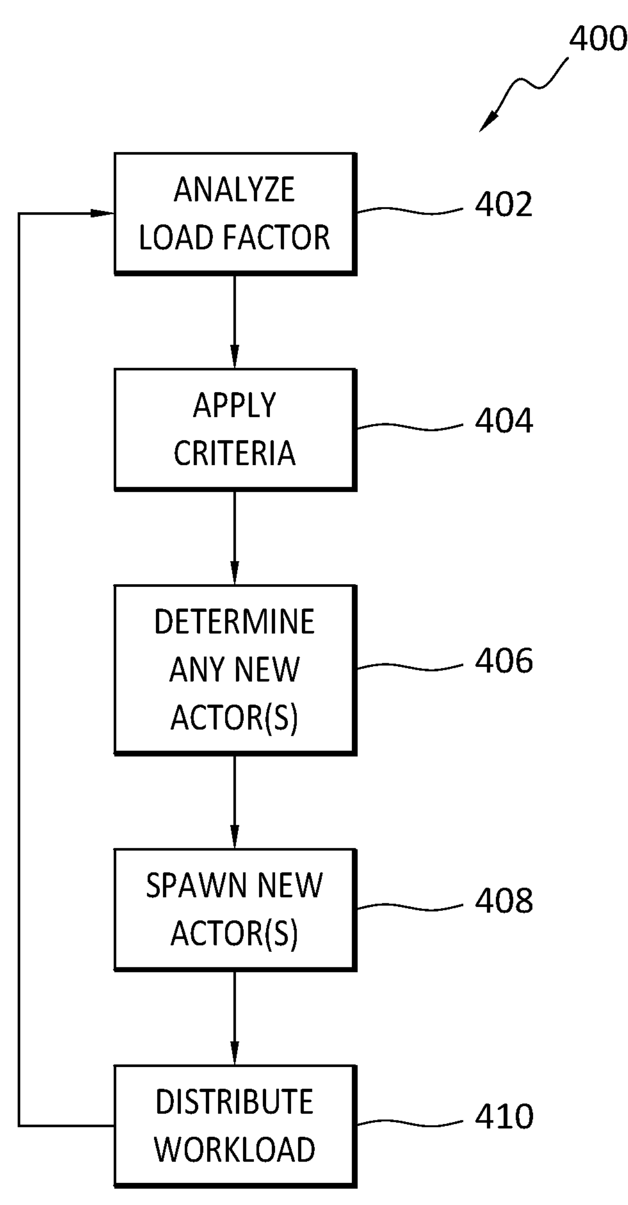
FIG. 4*a* discloses a method for microservice scaling, according to some example embodiments.

It is noted with respect to the disclosed methods, including the example method of FIG. 4*a*, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 4*a*, the example method 400 may be implemented in whole, or in part, by an analytic engine that may be hosted on a data storage platform, or simply 'storage platform.' The analytic engine may interact, directly or indirectly, with any or all of a root actor, copy discovery actor(s), and host(s). No particular configuration or arrangement of entities is required for any embodiment however.

The example method 400 may begin at 402 when a load factor on a system is analyzed. Analysis of a load factor 402 may be performed, possibly automatically, at discrete intervals, or on an ongoing basis. Analysis 402 of the load factor may reveal information about the performance of the system, and various criteria may be applied 404 to this information. By way of illustration, analysis 402 of the load factor may reveal that an actor in the system has a particular wait time for processing a copy discovery request, and application 404 of the criteria may further reveal that the particular wait time exceeds an established standard.

Depending upon the outcome of the application 404 of the criteria, a determination may be made 406 that one or more additional actors are required in order to meet the criteria, which may comprise an SLA for example. When the number of additional actors has been determined 406, those actors may be automatically spawned 408. After the additional actor(s) have been spawned 408, the workload, or portions of it, may be distributed 410, or redistributed, among the actors, including the newly spawned 408 actors.

The method 400 may be performed on an ongoing basis, and the operations 404 through 410 may be performed automatically based on an outcome of the load factor analysis 402. In this way, the number of actors and thus, the amount of resources (such as CPU, RAM, and/or other resources) allocated and consumed, may automatically scale up or down depending upon the detected, and/or anticipated, workload in the system.

F. Further Example Embodiments

F.1 Actor Swarming

As noted herein, some embodiments may operate to analyze a load factor on a microservice, or microservices, and determine, based on the load factor, a number of actors needed to support the load for SLA compliance or other criteria. If the existing number of actors is determined to be inadequate in this regard, one or more additional actors may be spawned, and the load automatically distributed among all the actors. In some embodiments, the number of actors spawned, and/or load distribution decisions, may be based upon a respective queue depth of one or more actors, and the latency associated with processing operations performed by those actors.

Yet other embodiments may employ an actor swarming approach to the performance of one or more loads that have been imposed on, or at least targeted to, one or more microservices. In some instances, the swarming approach may be implemented by mapping various connected jobs.

Connected jobs may, or may not, be elements of a common processing pipeline that includes the connected jobs, and possibly includes other jobs as well. Further, the connected jobs may, or may not, have a dependent relation with each other. For example, it may be the case that one or more subsequent jobs are performed based on the outcome of the performance of one or more preceding jobs. As another example, it may be the case that one or more subsequent jobs cannot be performed unless, or until, one or more preceding jobs have first been partially, or fully, completed.

In another example, the performance of connected jobs may be such that the jobs are performed in respective time frames that partially or completely overlap with each other. In still another example, the connected jobs may be performed in serial fashion, with one or more subsequent jobs not starting until after one or more preceding jobs have finished.

Because, in these examples, various jobs may be connected with each other in some way, it may be advantageous to consider the connectedness of various jobs when determining a number of actors that are expected to be needed to perform those jobs. That is, it may be advantageous to consider various operations and processing pipelines as a whole, rather than on an individual job basis, when determining how many actors may be needed.

This approach may provide various advantages. For example, the number of spawning processes that may be required may be reduced since, in some embodiments, all the actors collectively needed for the jobs, or a subset of jobs, in a process pipeline may be spawned at once, rather than job-by-job. As well, the latency in the performance of the jobs may be reduced since the number of spawning processes, which take at least some time to perform, may be reduced. Following is an illustrative example of the use of an actor swarming approach according to some embodiments.

Suppose, for example, that a system spawned an increased number of actors for a backup workflow, and suppose further that a replication process is expected to be performed after completion of the backup workflow. In this example, the backup workflow and the replication process are related jobs, and may be included in a common processing pipeline. Note that in this example, the replication process may be dependent upon, and performed only after completion of, the backup workflow. As well, the total number of actors spawned for a group of connected jobs may be a function of, for example, whichever job(s) require the most actors.

Thus, for example, if the replication process requires more actors than the backup workflow, the requirements of the replication process may determine how many actors are spawned, even if that number of actors is greater than what would be needed for just the backup workflow. Even though more actors may be spawned than initially needed, the savings of time/resources in performing the swarming approach may still outweigh, possibly significantly, any inefficiencies in spawning those actors. As this example illustrates, embodiments may, rather than looking at adding actors/transaction or job, embodiments may allocate relatively more actors throughout the whole chain of connected operations.

Figure 4B:
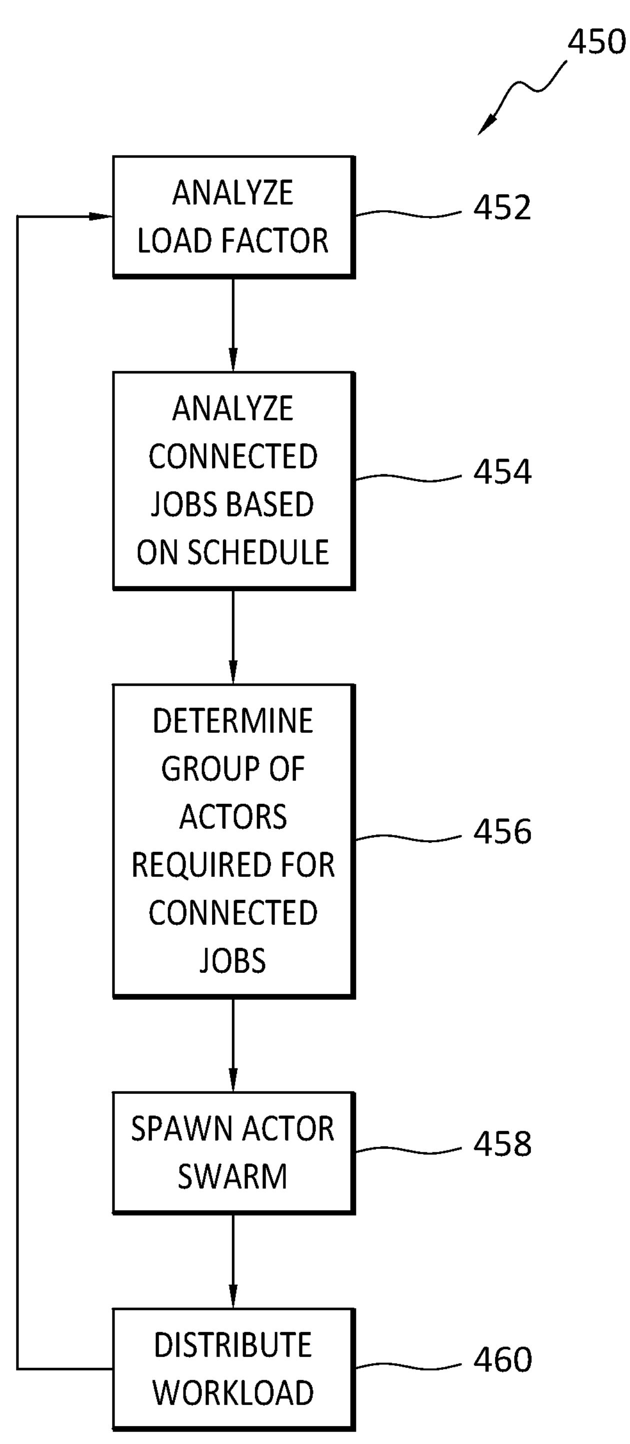
FIG. 4*b* discloses an example method for actor swarming.

With reference now to FIG. 4*b*, an example method 450 is disclosed that may involve the use of actor swarming to perform two or more connected jobs. In general, and except as noted hereafter, the method 450 may be similar, or identical, the method 400 of FIG. 4*a*. As such, the following discussion is directed primarily to selected differences between the two example methods.

The method 450 may begin with the analyzing of a load factor of a system 452 to determine whether or not additional actors are needed for two or more connected jobs. In some embodiments, a default number of actors may be spawned prior to commencement of the connected jobs, but that is not necessarily required. Thus, in those embodiments, the number of additional actors may be zero, or some number greater than zero, depending upon the nature of the jobs. In other embodiments, the analyzing 452 may be performed before any of the jobs begins, so that a suitable number of actors can be spawned all at once in a swarm prior to commencement of any of the connected jobs.

At 454, the connected jobs may be analyzed for each workload based on the schedule per PLC (programmable logic controller)/host. To illustrate, for copies from hosts, connected jobs such as replication, the cloud tier schedule may be different.

Next, a determination may be made 456 as to how many actors are needed for the swarm of actors necessary to perform a group of connected jobs. For example, the determination 456 may involve determining how many actors, or additional (new) actors, are needed based on a copy discovery workload and any jobs connected to the copy discovery workload that may need to run.

Based on the determining 456, a swarm of actors may then be spawned 458, and the workload collectively represented by the connected jobs distributed 460 amongst the actors in the swarm.

F.2 Some Example Embodiments

Following are some further example embodiments of the invention. These are presented only by way of example and are not intended to limit the scope of the invention in any way.

Embodiment 1. A method, comprising: analyzing a load factor regarding a workload for one or more actors in a data storage platform, wherein the workload comprises a group of two or more connected jobs; applying one or more criteria to an output of the load factor analyzing; based on the applying a criterion from the one or more criteria, determining how many actors should be included in a swarm of actors necessary to perform all of the connected jobs; spawning the swarm of actors; and load balancing the connected jobs across the swarm of actors.

Embodiment 2. The method as recited in embodiment 1, wherein other than the spawning of the swarm of actors, no other actors are needed, or spawned, for performance of the connected jobs.

Embodiment 3. The method as recited in any of embodiments 1-2, wherein the workload comprises servicing copy discovery notifications received from one or more hosts.

Embodiment 4. The method as recited in of embodiments 1-3, wherein one or more of the actors comprises a microservice, or an instance of a microservice. Embodiment 5. The method as recited in of embodiments 1-4, wherein the spawning and load balance operations are performed automatically based on the applying of the criterion.

Embodiment 6. The method as recited in of embodiments 1-5, wherein the number of actors in the swarm is a function of whichever of the connected jobs requires the most actors.

Embodiment 7. The method as recited in of embodiments 1-6, wherein performance of one of the connected jobs cannot begin until performance of another of the connected jobs has been completed.

Embodiment 8. The method as recited in of embodiments 1-7, wherein performance of one of the connected jobs is a prerequisite to performance of another of the connected jobs.

Embodiment 9. The method as recited in of embodiments 1-8, wherein the load factor comprises a number of copy discovery notifications incoming to the data storage platform.

Embodiment 10. The method as recited in of embodiments 1-9, wherein one of the connected jobs is a backup workflow, and another of the connected jobs is a replication process.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
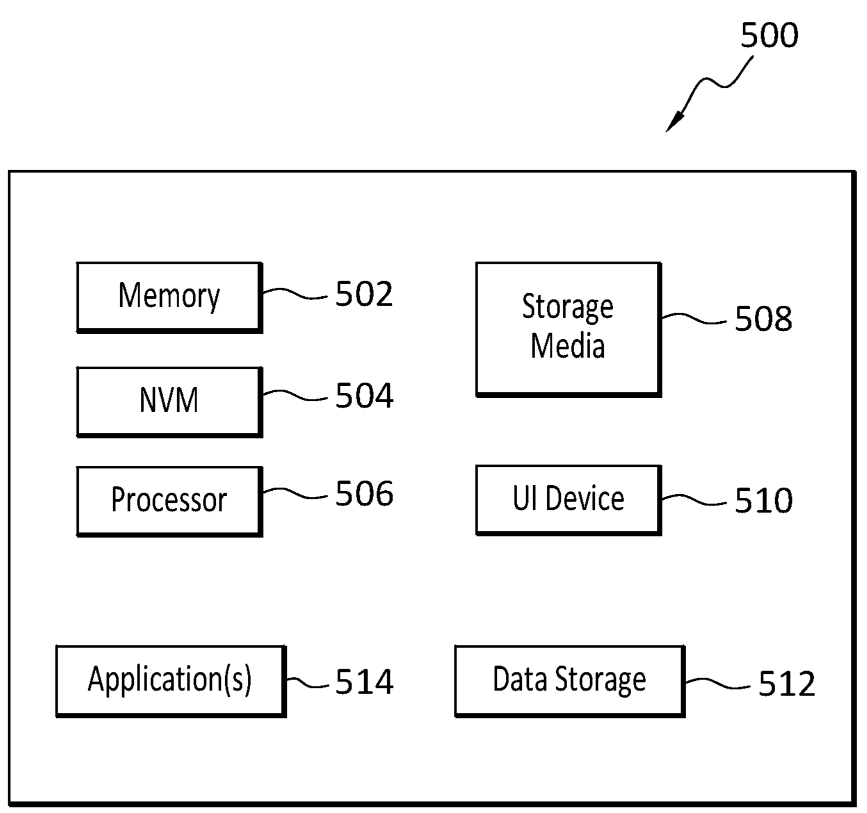
FIG. 5 discloses an example computing entity operable to perform any of the claimed methods, processes, and operations.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI (user interface) device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage platform, whether on-premises at an enterprise, or a cloud computing site, client, datacenter, data protection site including a cloud storage platform, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

analyzing a load factor regarding a new message as a workload for one or more actors in a data storage platform, wherein each of the actors of the one or more actors includes a respective queue for messages to be serially performed by that actor, and the workload comprises a copy discovery workload that specifies a particular host having one or more copies ready to be stored in the data storage platform, and the workload comprises a group of two or more connected jobs, and the analyzing of the load factor comprises measuring a respective queue performance of one or more of the actors based on a depth of a queue, a latency of message processing per each of the queues, and an average processing time for each item in each of the queues;

applying one or more criteria to an output of the load factor analyzing;

based on depths of the respective queues of actors in a swarm of actors and the applying the one or more criteria, determining how many of the actors and how many new actors should be included in the swarm of actors targeted to perform all of the connected jobs, wherein a total number of actors in the swarm of actors is a function of a connected job, requiring the most actors, from among the group of connected jobs;

spawning the new actors, as determined in the determining, and creating the swarm of actors by combining the new actors with the actors;

load balancing the connected jobs across the swarm of actors by distributing the connected jobs amongst all the actors in the swarm of actors and performing, in the data storage platform, by one of the actors of the swarm to which the connected jobs have been distributed, one of the connected jobs, and the performing of the one connected job comprises performing a data protection process directed to the one or more copies.

2. The method as recited in claim 1, wherein other than the spawning of the swarm of actors, no other actors are needed, or spawned, for performance of the connected jobs.

3. The method as recited in claim 1, wherein the workload comprises servicing copy discovery notifications received from one or more hosts.

4. The method as recited in claim 1, wherein one or more of the actors comprises a microservice, or an instance of a microservice.

5. The method as recited in claim 1, wherein the spawning and load balance operations are performed automatically in response to the applying of the one or more criteria.

6. The method as recited in claim 1, wherein performance of one of the connected jobs cannot begin until performance of another of the connected jobs has been completed.

7. The method as recited in claim 1, wherein performance of one of the connected jobs is a prerequisite to performance of another of the connected jobs.

8. The method as recited in claim 1, wherein the load factor comprises a number of copy discovery notifications incoming to the data storage platform.

9. The method as recited in claim 1, wherein the data protection process is a backup workflow or a replication process.

10. A non-transitory storage medium having stored therein instructions that are executable by one or more hardware processors to perform operations comprising:

analyzing a load factor regarding a new message as a workload for one or more actors in a data storage platform, wherein each of the actors of the one or more actors includes a respective queue for messages to be serially performed by that actor, and the workload comprises a copy discovery workload that specifies a particular host having one or more copies ready to be stored in the data storage platform, and the workload comprises a group of two or more connected jobs, and the analyzing of the load factor comprises measuring a respective queue performance of one or more of the actors based on a depth of a queue, a latency of message processing per each of the queues, and an average processing time for each item in each of the queues;

applying one or more criteria to an output of the load factor analyzing;

based on depths of the respective queues of actors in a swarm of actors and the applying the one or more criteria, determining how many of the actors and how many new actors should be included in the swarm of actors targeted to perform all of the connected jobs, wherein a total number of actors in the swarm of actors is a function of a connected job, requiring the most actors, from among the group of connected jobs;

spawning the new actors, as determined in the determining, and creating the swarm of actors by combining the new actors with the actors;

load balancing the connected jobs across the swarm of actors by distributing the connected jobs amongst all the actors in the swarm of actors and performing, in the data storage platform, by one of the actors of the swarm to which the connected jobs have been distributed, one of the connected jobs, and the performing of the one connected job comprises performing a data protection process directed to the one or more copies.

11. The non-transitory storage medium as recited in claim 10, wherein other than the spawning of the swarm of actors, no other actors are needed, or spawned, for performance of the connected jobs.

12. The non-transitory storage medium as recited in claim 10, wherein the workload comprises servicing copy discovery notifications received from one or more hosts.

13. The non-transitory storage medium as recited in claim 10, wherein one or more of the actors comprises a microservice, or an instance of a microservice.

14. The non-transitory storage medium as recited in claim 10, wherein the spawning and load balance operations are performed automatically in response to the applying of the one or more criteria.

15. The non-transitory storage medium as recited in claim 10, wherein performance of one of the connected jobs cannot begin until performance of another of the connected jobs has been completed.

16. The non-transitory storage medium as recited in claim 10, wherein performance of one of the connected jobs is a prerequisite to performance of another of the connected jobs.

17. The non-transitory storage medium as recited in claim 10, wherein the load factor comprises a number of copy discovery notifications incoming to the data storage platform.

18. The non-transitory storage medium as recited in claim 10, wherein the data protection process is a backup workflow or a replication process.

* * * * *